US006645658B2

United States Patent
Morozumi (10) Patent No.: US 6,645,658 B2
(45) Date of Patent: Nov. 11, 2003

(54) CONDUCTIVE PLATE AND MANUFACTURING METHOD THEREOF

(75) Inventor: Eiichiro Morozumi, Toyota (JP)

(73) Assignee: Araco Kabushiki Kaisha (JP)

( * ) Notice: Subject to any disclaimer, the term of this patent is extended or adjusted under 35 U.S.C. 154(b) by 94 days.

(21) Appl. No.: 09/991,996

(22) Filed: Nov. 26, 2001

(65) Prior Publication Data

US 2002/0065000 A1 May 30, 2002

(30) Foreign Application Priority Data

Nov. 28, 2000 (JP) .......................... 2000-361330

(51) Int. Cl.[7] ............................................. H01M 2/02
(52) U.S. Cl. ............................. 429/34; 429/30; 429/35
(58) Field of Search ............................ 429/30, 34, 35

(56) References Cited

U.S. PATENT DOCUMENTS 6,472,094 B1 * 10/2002 Nonoyama et al. ........... 429/34
6,531,236 B1 * 3/2003 Hatoh et al. .................. 429/34

FOREIGN PATENT DOCUMENTS

| JP | A 5-74469 | 3/1993 |
| WO | WO 00/39872 | 7/2000 |

* cited by examiner

*Primary Examiner*—Carol Chaney
*Assistant Examiner*—Dah Wei D Yuan
(74) *Attorney, Agent, or Firm*—Oliff & Berridge, PLC (57) ABSTRACT

A separator of this invention is so constructed that a plurality of protrusions are implanted in a substrate which forms a reactive chamber of a fuel cell. The substrate has a multiple layered structure in which a single side or both sides of a mesh foundation are covered with resin layer and contains through holes at positions corresponding to each of the protrusions. Each of the protrusions is formed by allowing black lead ink applied on the single side or both sides of the substrate to invade each through hole. Consequently, the substrate can be formed to be super thin, lightweight and the respective protrusions can be easily formed at low cost.

9 Claims, 10 Drawing Sheets

CONDUCTIVE PLATE AND MANUFACTURING METHOD THEREOF

INCORPORATION BY REFERENCE

The disclosure of Japanese Patent Application No. 2000-361330 filed on Nov. 28, 2000 including the specification, drawings and abstract is incorporated herein by reference in its entirety.

BACKGROUND OF THE INVENTION

1. Field of the Invention

The invention relates to a conductive plate, for example, a separator for a fuel cell, which employs fuel gas and oxidant gas as reactive gas.

2. Description of the Related Art

The separator for a fuel cell which employs fuel gas and oxidant gas as reactive gas is provide with a substrate for forming a reactive chamber of the fuel cell and a plurality of protrusions implanted in the substrate such that they protrude from a single side or both sides of the substrate so as to make contact with electrodes of the fuel cell. A plurality of solid electrolyte films and a plurality of positive/negative electrodes are laminated in a plurality of layers so as to form the fuel cell. Because the separator is required to have an excellent conductivity, it is produced for general use by machining a carbon block into a flat substrate having a plurality of protrusions.

Therefore, this type of the separator is expensive, thick and heavy. Because the separator is produced by laminating a plurality of the solid electrolyte films and a plurality of the positive/negative electrodes into a plurality of layers, the fuel cell cannot help being expensive, large and heavy. These problems are a major reason which prevents widespread use of this type of fuel cells. Thus, there has been a demand for this type of the separator, which is also cheap, thin and lightweight and, for example, Japanese Patent Application Laid-Open No. 5-74469 has already disclosed a separator which addresses these problems.

In the separator proposed in that laid-open, a plurality of carbon rods are implanted in a sheet-like molded body made of synthetic resin and respective carbon rods are formed integrally with the sheet-like molded body when that sheet-like molded body is formed.

Meanwhile, in the separator proposed in the above-described publication, the respective carbon rods are implanted integrally with the sheet-like molded body. In this implantation condition, for the respective carbon rods to be supported by the sheet-like molded body in air-tightness without gas leakage, that sheet-like molded body needs to be formed in a sufficiently large thickness. As a result, the separator becomes thick, so that the fuel cell is enlarged in size in the direction of laminating components. Further, upon manufacturing the separator, a plurality of the carbon rods need to be prepared. Because the carbon rods are formed by sintering and molding carbon powder, it takes a high cost to mold a plurality of the carbon rods, so that the price of the carbon rods is reflected upon the separator, thereby increasing the price of the separator.

SUMMARY OF THE INVENTION

Accordingly, it is an object of one aspect of the invention to provide a conductive plate, for example, a separator, which is capable of solving the above problems and much thinner, as well as lighter and smaller than the conventional separator and which can be produced at low cost to ensure a cheap price.

To achieve the above object, the conductive plate according to a first aspect of the invention comprises a substrate and a plurality of protrusions implanted in the substrate such that the protrusions protrude from a single side or both sides of the substrate. The substrate has a multiple layered structure in which a single side or both sides of the mesh foundation are covered with resin layers and contains through holes at positions corresponding to each of the protrusions. The respective protrusions are formed by invasion of black lead paint applied on the single side or both sides of the substrate into the respective through holes in the substrate.

Because in the conductive plate according to the first aspect, the substrate is constructed in a multiple layered structure in which a single side or both sides of the mesh foundation are covered with resin layer, the thickness of the substrate can be reduced considerably. Thus, by forming the substrate super thin and lightweight, the conductive plate can be constructed in which the thickness of the substrate that becomes a dead space within the structure of the fuel cell is very small. Consequently, a small fuel cell can be constructed in the direction of laminating the respective components and a large-scale reduction of the weight can be achieved.

According to the manufacturing method of the conductive plate according to a second aspect of the invention, a substrate is formed by covering the mesh foundation with a resin layer, the resin layer being formed by coating a single side or both sides of the mesh foundation with resin or impregnating the mesh foundation with resin and having the through holes at predetermined positions. Then, the black lead paint is applied to one face or both sides of the substrate so as to form protrusions at positions corresponding to the through holes. Next, the thus formed protrusions are hardened.

In the first and second aspects of the invention, the conductive plate may be a separator for a fuel cell.

DETAILED DESCRIPTION OF THE PREFERRED EMBODIMENTS

Figure 1A:
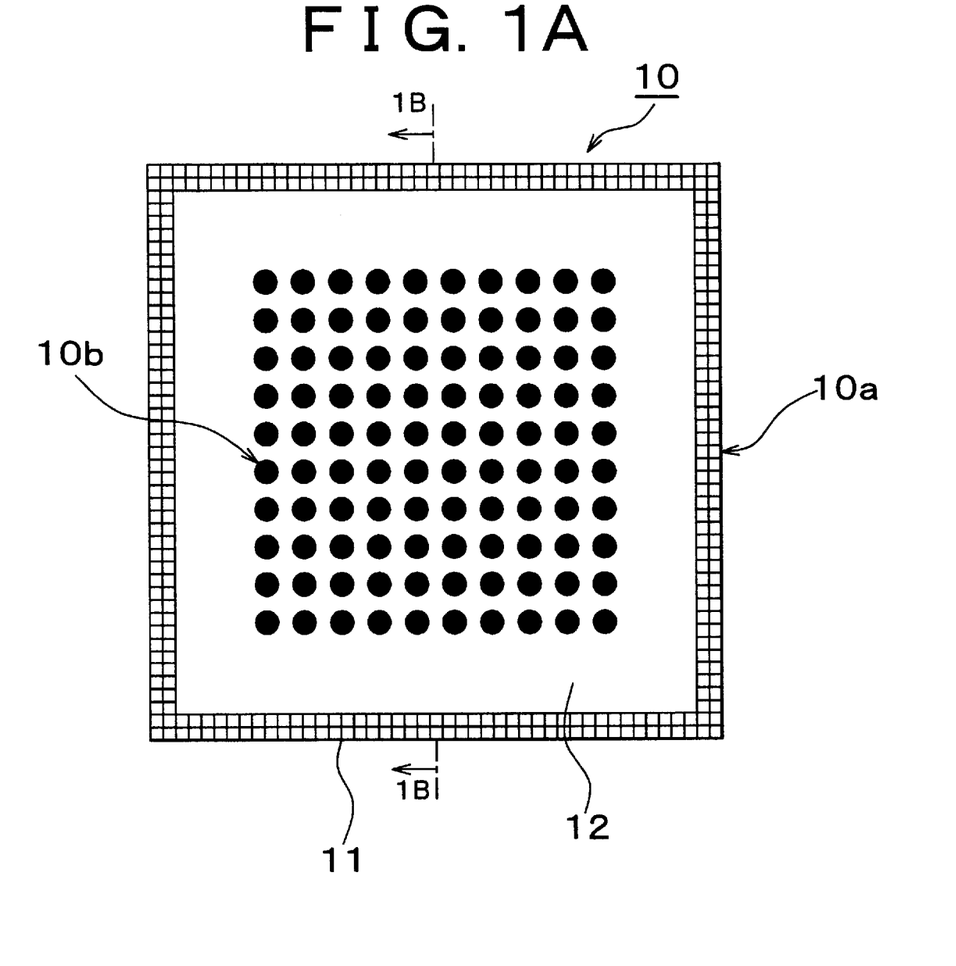
FIG. 1A is a plan view of the separator according to an example of the invention and FIG. 1B is a sectional view from which the section is taken is shown on FIG. 1A by a pair of broken lines 1B.
Figure 1B:
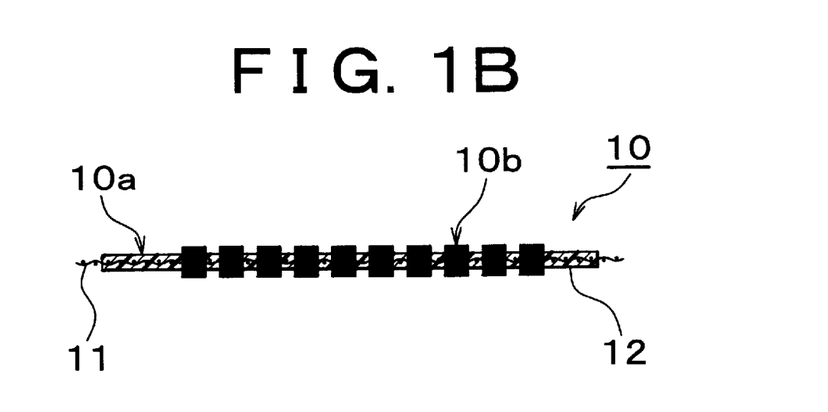
Figure 2A:
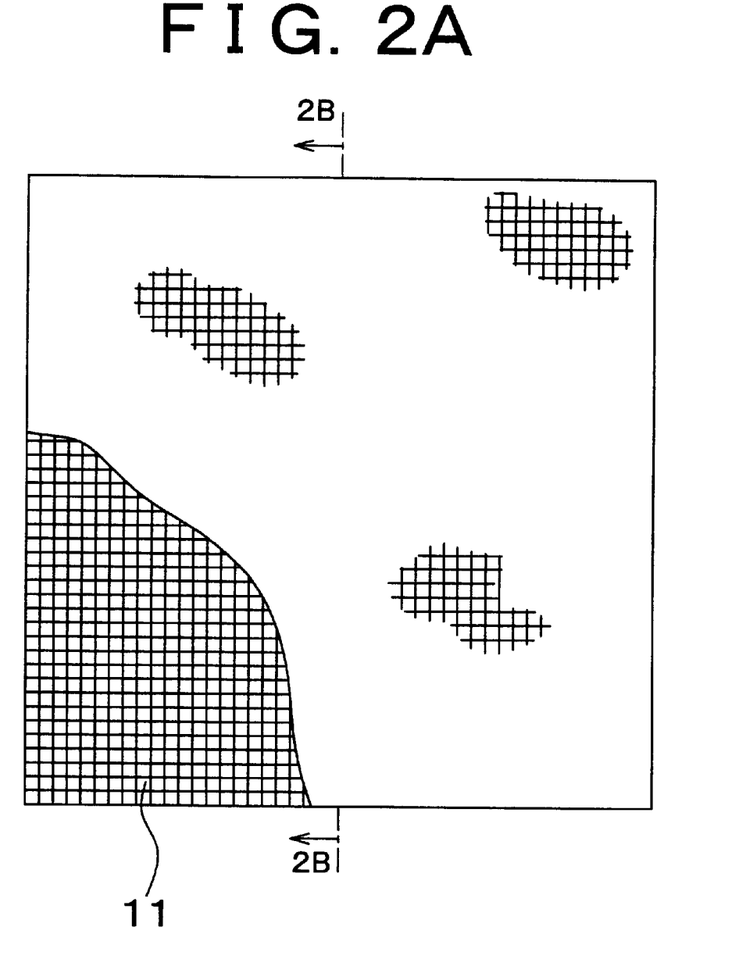
FIG. 2A is a partially omitted plan view of a mesh foundation constituting the separator and FIG. 2B is a sectional view from which the section is taken is shown on FIG. 2A by a pair of broken lines 2B.
Figure 2B:
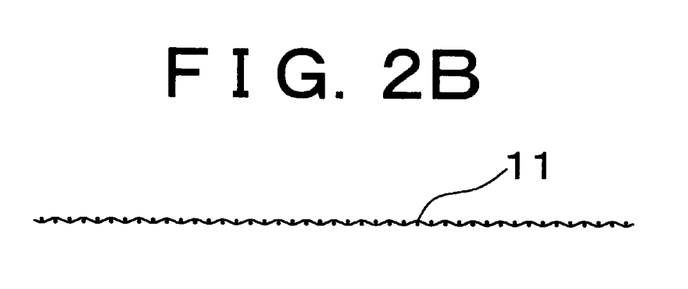
Figure 3A:
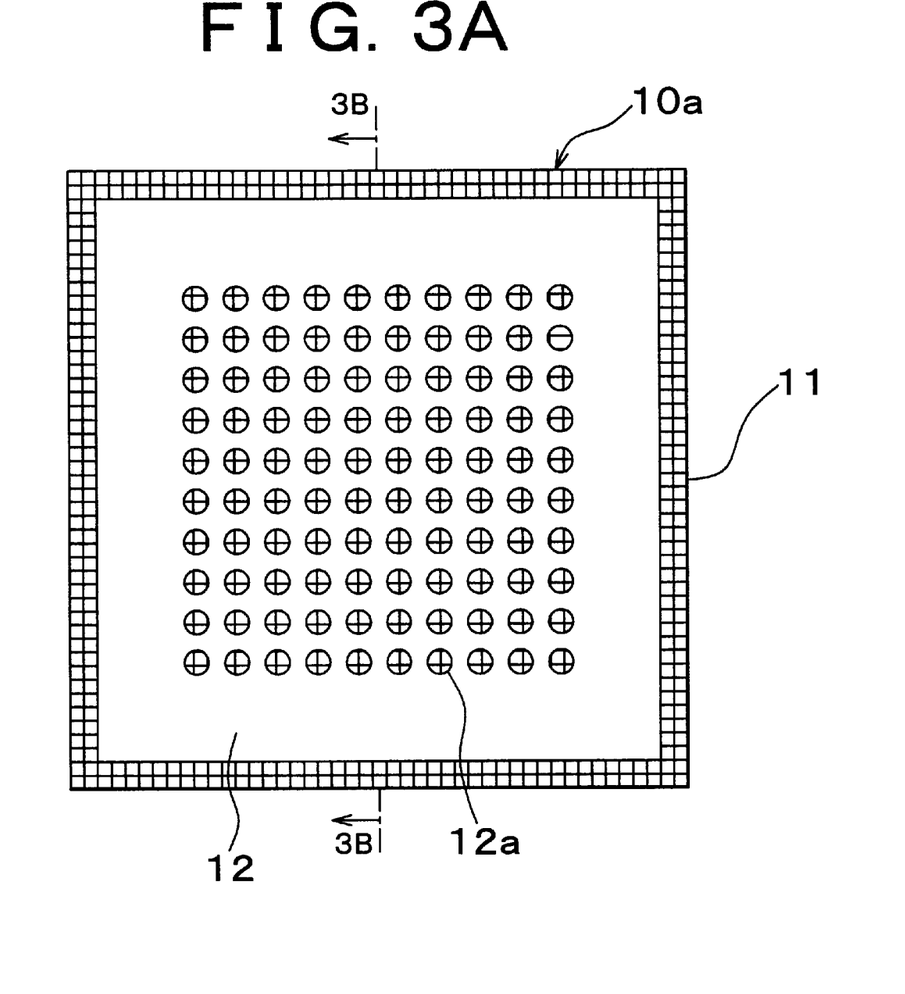
FIG. 3A is a plan view of a substrate constituting the separator and FIG. 3B is a sectional view from which the section is taken is shown on FIG. 3A by a pair of broken lines 3B.
Figure 3B:
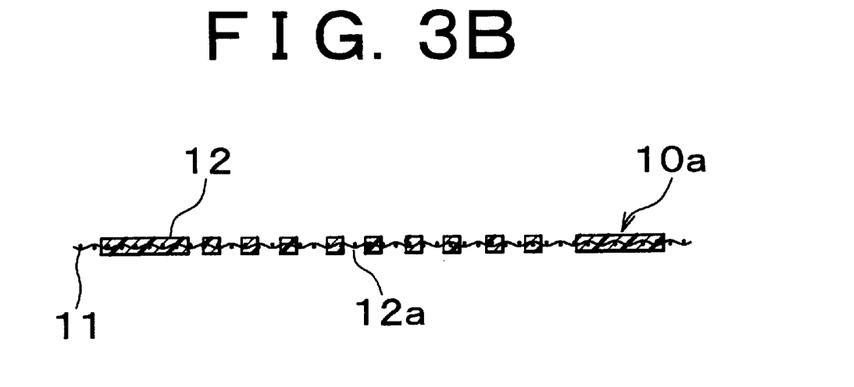
Figure 4:
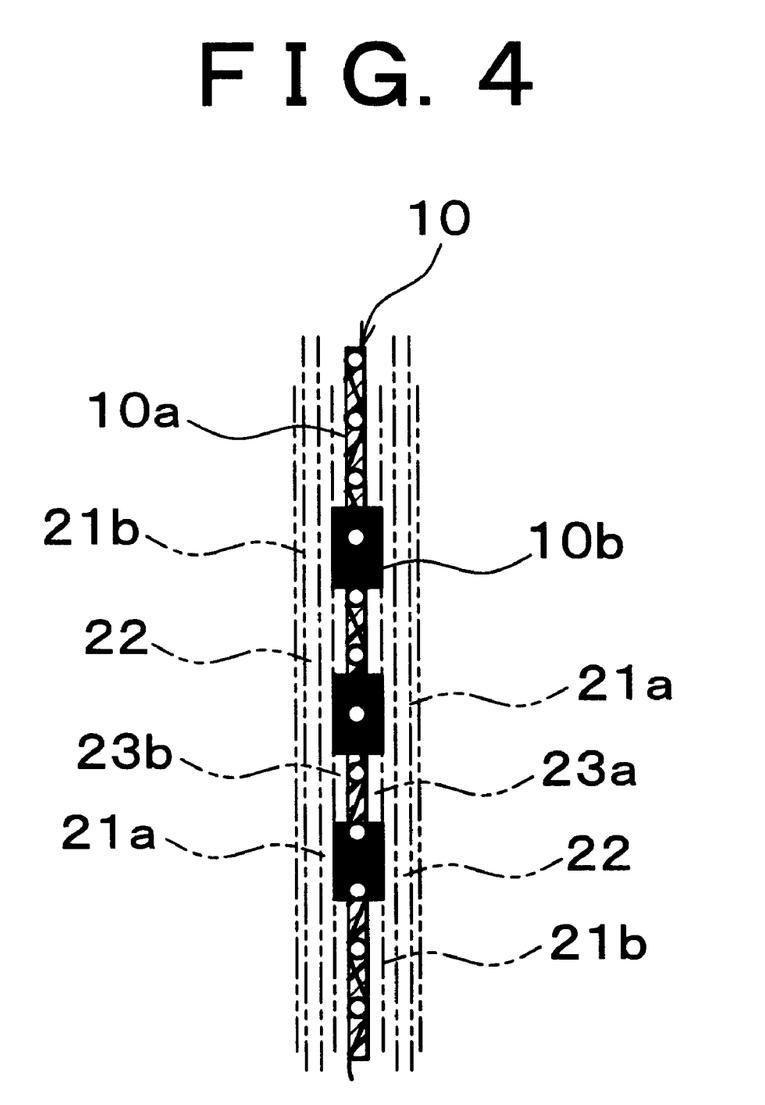
FIG. 4 is a longitudinal sectional view showing schematically an arrangement of the separator in a fuel cell.

Hereinafter, the invention will be described with reference to the accompanying drawings. FIGS. 1A, 1B show a separator of the fuel cell according to an embodiment of the invention. The separator 10 is constituted by a substrate 10a and a plurality of protrusions 10b. The substrate 10a is constituting a mesh foundation 11 and resin layers 12 made of synthetic resin which are bonded to both front and rear surfaces of the mesh foundation 11 in order to cover both front and rear surfaces. FIGS. 2A, 2B show the mesh foundation 11 which constitutes the substrate 10a. FIGS. 3A, 3B show the substrate 10a in which both front and rear surfaces of the mesh foundation 11 are covered with the resin layers 12. FIG. 4 shows schematically an arrangement of the separator in the fuel cell.

In this separator 10, a plurality of the protrusions 10b are implanted in the substrate 10a such that they pass through. The substrate 10a has a multiple layered structure constituting the mesh foundation 11 and the resin layer 12 for covering both front and rear surfaces of the mesh foundation 11. Each protrusion 10b is composed of black lead compound of black lead paint and formed by being dried and solidified (harden) in such a condition that it is implanted in the substrate 10a.

As shown in FIGS. 2A, 2B, the mesh foundation 11 has a predetermined rough mesh size, which is set up to a size allowing the black lead compound of black lead paint for composing the protrusion 10b to pass through. The mesh foundation 11 is formed by weaving synthetic fibers such as inorganic fibers including glass fiber, carbon fiber, metallic fiber and the like, polyester fiber and polyamide fiber and the like. Nonconductive synthetic resin such as polyvinylidene chloride and polyacrylonitrile is applied on the mesh foundation 11 and then, both front and rear surfaces are covered with the resin layers 12 made of synthetic resin so as to produce the substrate 10a. FIGS. 3A, 3B show the substrate 10a.

The resin layer 12 constituting the substrate 10a has the function for shielding fuel gas and reactive gas in the fuel cell and includes a plurality of through holes 12a which pass through between the front surface and the rear surface. Each through hole 12a is open to the mesh foundation 11. Therefore, each through hole 12a passes through mesh holes in the mesh foundation between the front surface and the rear surface. Meanwhile, the through hole may be formed of a through hole in the mesh foundation and a mesh hole in the mesh foundation and it is permissible to construct the resin layer integrally with the mesh foundation. Black lead coated on the resin layer 12 of the substrate 10a invades each through hole 12a in the substrate 10a so that it is implanted therein. The black lead paint implanted forms each protrusion 10b after being dried and solidified (harden).

In the separator 10 with such a configuration, as schematically shown in FIG. 4 for example, positive and negative electrodes 21a, 21b are disposed between solid electrolyte films 22 bonded on the right and left faces so as to form a fuel cell. In a condition in which the respective electrodes are disposed between the solid electrolyte films 22, an end of each protrusion 10b makes contact with one electrode 21a while the other end makes contact with the other electrode 21b. Further, the substrate 10a shields a gap between both solid electrolyte films 22 so as to form reaction chambers 23a, 23b in which fuel gas (hydrogen gas) or oxidant gas (air) is introduced.

Figure 5:
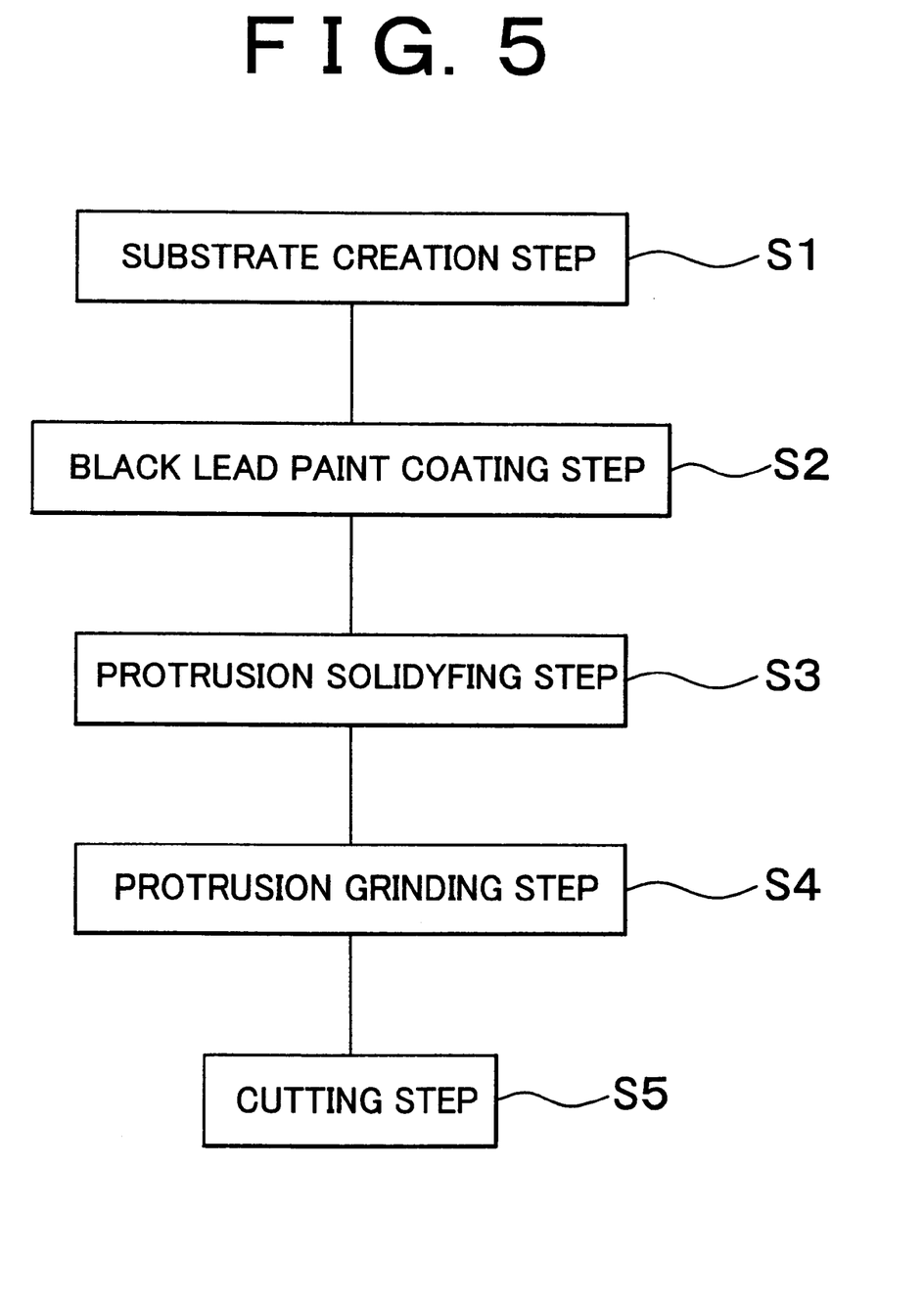
FIG. 5 is a flow chart showing the sequence of steps of manufacturing process for the separator.

The separator 10 is produced according to a manufacturing process shown in a flow chart of FIG. 5. This manufacturing process indicates an example of the manufacturing method of the separator according to the invention, and includes a substrate manufacturing step (S1) for producing the substrate 10a (see FIGS. 6A, 6B, 7A, 7B), a black lead paint coating step (S2) (see FIGS. 8A, 8B, 9A and 9B) for implanting each protrusion 10b in the substrate 10a, a drying/solidifying step (a hardening step) (S3) for drying and solidifying (hardening) each protrusion 10b and a grinding step (S4) for grinding each dried and solidified protrusion 10b and a cut step (S5) for cutting the separator in a predetermined size.

Two methods are applicable for creating the substrate 10a. The first method is using a substrate creating plate 30a shown in substrate creating process diagram shown in FIGS. 6A, 6B. The substrate creating plate 30a is prepared by stretching a screen 32 on the peripheral portion of an opening in a frame body 31. The screen 32 is formed by weaving inorganic fiber such as stainless fiber or synthetic fiber such as polyamide fiber, polyester fiber. The screen 32 is coated with diazo photo-sensitive emulsion and then processed according to photographic sensitive method so that it has a plurality of through holes 32a in its surface.

Figure 6A:
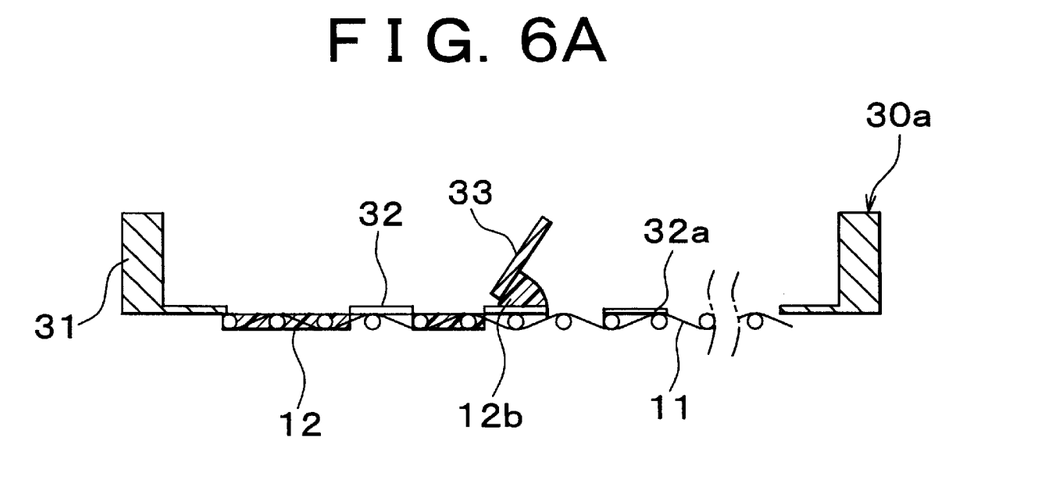
FIG. 6A is a longitudinal sectional view showing a process based on the first manufacturing method for the substrate and FIG. 6B is a longitudinal sectional view of a substrate produced in the process.
Figure 6B:
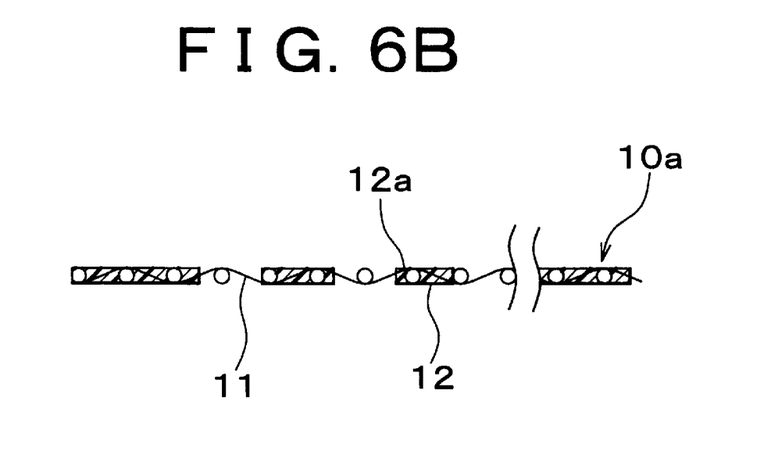

The screen 32 of the substrate creating plate 30a may be produced by drilling appropriately a metallic plate such as stainless plate or synthetic resin plate to form a plurality of through holes. As a drilling means, machine processing, punching, electric discharge processing, laser processing, water jet processing, etching, sand blasting and the like may be applied.

To create the substrate 10a using the substrate creating plate 30a, as shown in FIG. 6A, with the substrate creating plate 30a placed on the mesh foundation 11, the screen 32 is coated with synthetic resin 12b (screen printing) to form the resin layer 12. Consequently, the synthetic resin 12b is applied to the surface of the mesh foundation 11 through each through hole 32a and conveyed through to the rear surface of the mesh foundation 11 so as to form the resin layer 12 on both front and rear surfaces of the mesh foundation 11. In this case, coating with synthetic resin 12b is carried out with a doctor knife 33. Other portions than the through holes in the screen 32 exert masking function to synthetic resin so as to form the through holes 12a at corresponding positions of the mesh foundation 11. Consequently, the substrate 10a is created as shown in FIG. 6B.

Figure 7A:
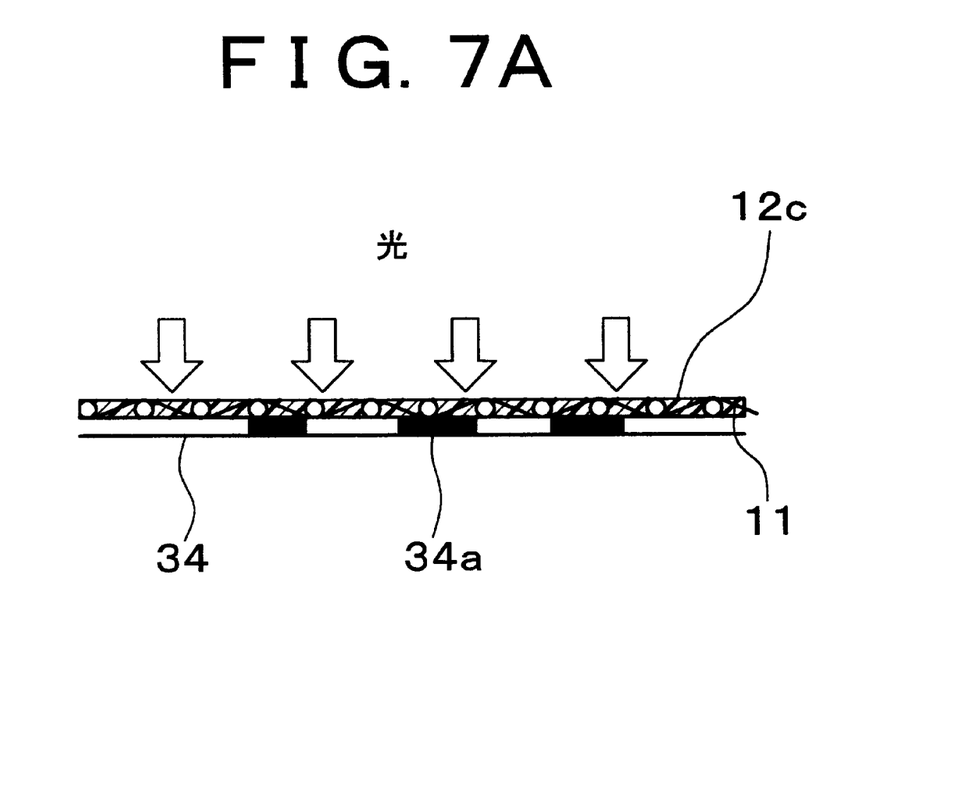
FIG. 7A is a longitudinal sectional view showing a process based on the second manufacturing method for the substrate and FIG. 7B is a longitudinal sectional view of a substrate produced in the process.
Figure 7B:
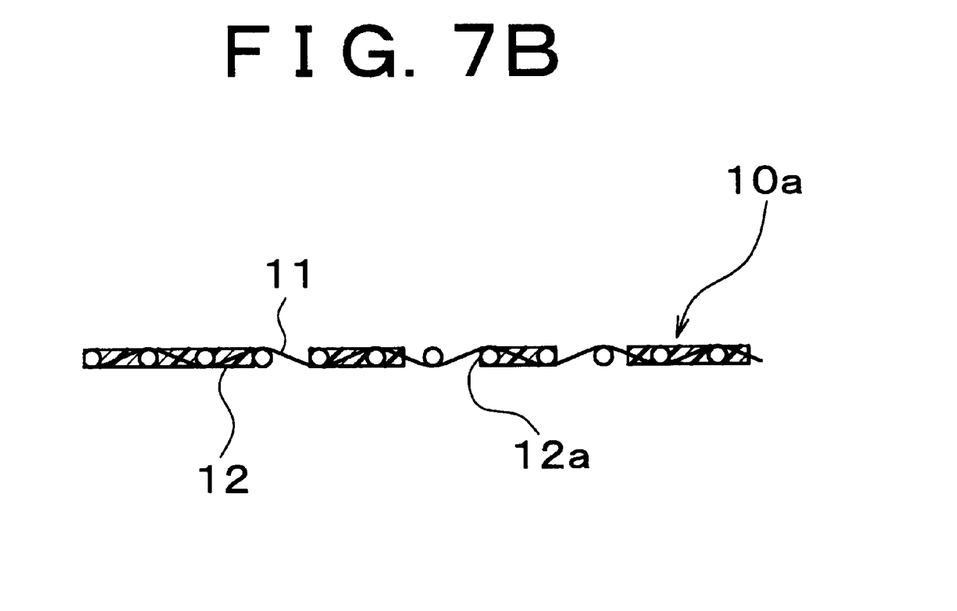

According to the second method for manufacturing the substrate 10a, the screen placed on the mesh foundation 11 is coated with synthetic resin 12b for forming the resin layer 12 (screen printing) so as to form the resin layer 12c on both front and rear surfaces of the mesh foundation 11. Then, this is placed on a lower sheet 34 and irradiated with strong light from above. Consequently, a portion in the resin layer 12c corresponding to a black portion 34a on the lower sheet 34 is melted so as to form a through hole 12a and finally, the substrate 10a shown in FIG. 7B is created. A film may be pasted on both front and rear surfaces of the mesh foundation 11 instead of the resin layer 12c. The mesh foundation 11 is placed on the lower sheet 34 and irradiated with strong light so that a portion in the film corresponding to the block portion of the lower sheet is melted to form the through holes.

In order to create the separator 10 using the substrate 10a, a black lead printing plate 30b and a printing base 30c shown in FIGS. 8A, 8B, 8C and 8D are employed and at the same time, black lead ink (black lead paint), which is a carbon base conductive paint for black lead printing, prepared preliminarily is used. The black lead paint is prepared in ink-like condition and applied onto the substrate according to a printing method for forming each protrusion on the substrate.

Upon preparation of the black lead ink, black lead such as natural black lead, artificial black lead, thermally expanded black lead or carbon black such as acetylene black, Ketjen black, denka black, furnace black is employed and an appropriate resin binder is added thereto and mixed together. A solvent is added as required to adjust the viscosity to one suitable to printing. As the black lead ink, a type in which black lead powder or carbon black powder (hereinafter referred to generally as carbon powder) is mixed with acrylic resin binder and the viscosity is adjusted with an appropriate solvent, a type in which carbon powder and epoxy resin binder are mixed together and the viscosity is adjusted with an appropriate solvent, a type in which carbon powder and phenol resin binder are mixed together and the viscosity is adjusted with an appropriate solvent, a type in which carbon powder and various types of thermoplastic resin binders are mixed together and the viscosity is adjusted with an appropriate solvent and others can be mentioned.

As the resin binder, evaporation drying type which is dried and solidified by evaporating the solvent, thermoplastic type, thermosetting type, UV hardening type, EB hardening type, two-liquid mixing type and the like can be mentioned.

If the thermosetting binder is employed as the resin binder for each of these black lead inks, the binder needs to be subjected to hardening processing after printing with black lead ink. If the thermoplastic binder is employed as the resin binder, the carbon powder and the resin binder are heated to a melting temperature and agitated together so as to regulate the black lead ink having an appropriate viscosity.

Figure 8A:
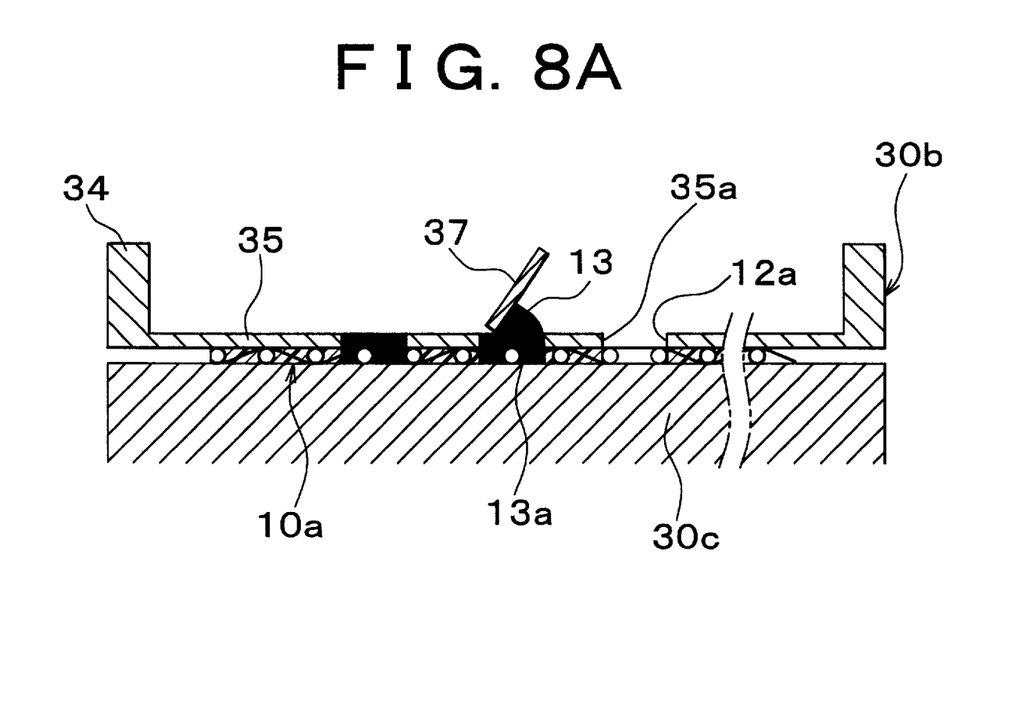
FIG. 8A is a longitudinal sectional view showing a first half process of the method for implanting the protrusions in the substrate.
Figure 8B:
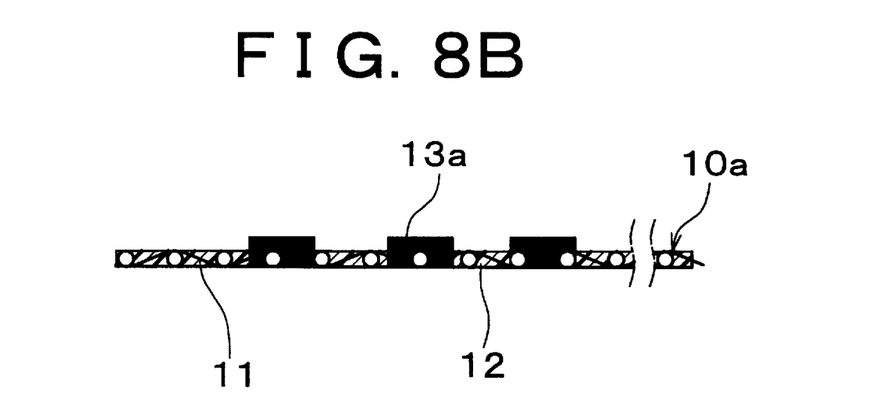
FIG. 8B is a longitudinal sectional view of the substrate in which a half protrusion is implanted in the process.
Figure 8C:
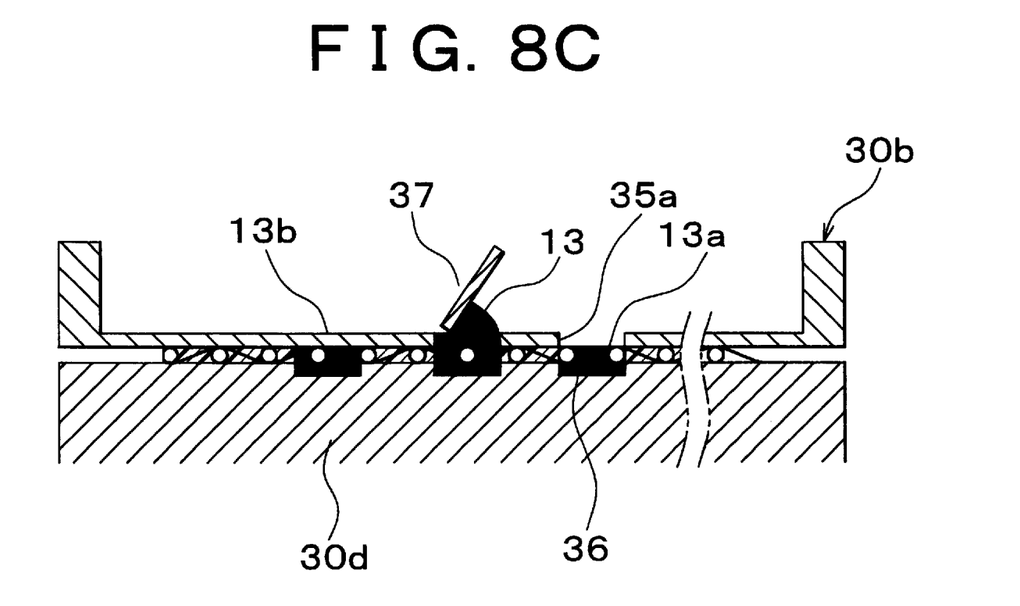
FIG. 8C is a longitudinal sectional view showing a latter half process of the method for implanting the protrusion in the substrate and FIG. 8D is a longitudinal sectional view of the substrate in which the half protrusion is implanted to be joined with the half protrusion implanted in the first half process.

The black lead printing plate 30b functions as a mask when the black lead ink is printed on the substrate 10a and composed in the same way as the substrate creating plate 30a. In the black lead printing plate 30b, as shown in FIGS. 8A, 8C, a plurality of through holes 35a are formed in the screen 35 stretched on the peripheral portion of an opening portion on an end of the frame 34 such that they oppose the through holes 12a possessed by the resin layer 12 of the substrate 10a. Upon printing the black lead ink 13 on the substrate 10a, two types of printing bases 30a, 30d shown in FIGS. 8A, 8C are employed. The first printing base 30c has a flat smooth top face and the second printing base 30d has a plurality of recess portions 36 opposing the through holes 35a in the black lead printing plate 30b.

Upon printing the black lead ink 13 on the substrate 10a, the substrate 10a is placed on the first printing base 30c as shown in FIG. 8A and the black lead printing plate 30b is placed on the substrate 10a. Then, the black lead ink 13 supplied onto the screen 35 of the black lead printing plate 30b is printed using the doctor knife 37. By this printing, the black lead ink 13 invades the respective through holes 35a in the screen 35 and reaches a top face of the first printing base 30c through the through hole 12a in the resin layer 12 of the substrate 10a. Consequently, as shown in FIG. 8B, a plurality of half protrusions 13a protruded from one side are formed on the substrate 10a. Each half protrusion 13a has a length corresponding to the depth of the through hole 35a in the screen 35 of the black lead printing plate 30b.

As shown in FIG. 8C, the substrate 10a implanted with the respective half protrusions 13a is inverted and placed on the second printing base 30d, and the black lead printing plate 30b is placed on the thus inverted substrate 10a. Then, the black lead ink 13 supplied to the screen 35 of the black lead printing plate 30b is printed using the doctor knife 37. When the substrate 10a is placed on the second printing base 30d, the respective half protrusions 13a are fit to the respective recess portions 36 in the second printing base 30d.

Figure 8D:
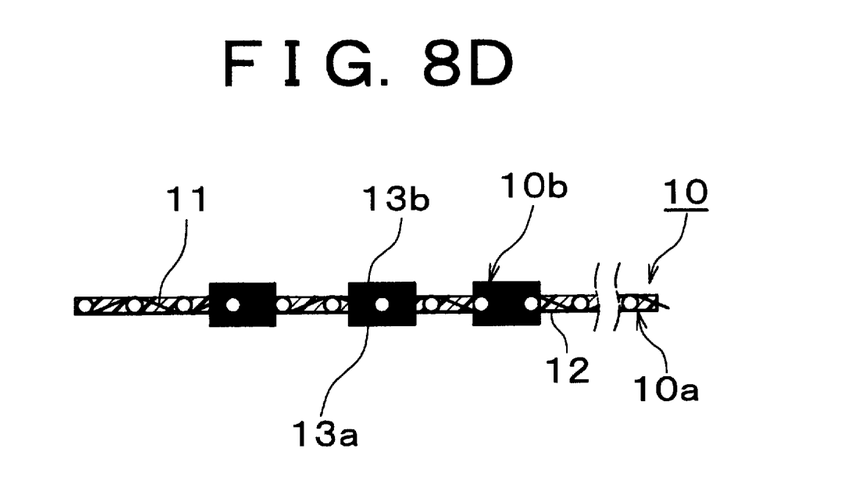

By such printing, the black lead ink 13 invades the respective through holes 35a in the screen 35 and reaches an end portion of the half protrusion 13a located in the through hole 12a in the resin layer 12 of the substrate 10a, so as to form the half protrusion 13b adjoining the end portion of the half protrusion 13a. Consequently, both half protrusions 13a, 13b are joined together so as to form the protrusion 10b. The half protrusion 13b has a length corresponding to the depth of the through hole 35a in the screen 35 of the black lead printing plate 30b. As shown in FIG. 8D, each protrusion 10b protrudes from both front and rear surfaces such that it penetrates the through hole 12a in the resin layer 12.

Figure 9A:
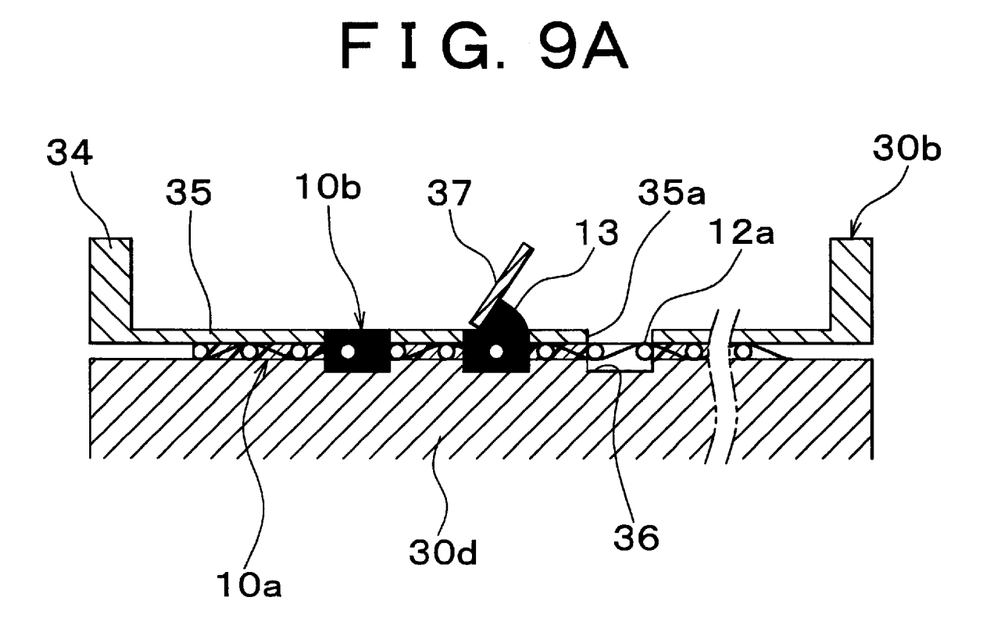
FIG. 9A is a longitudinal sectional view showing other method for implanting the protrusion in the substrate and FIG. 9B is a longitudinal sectional view of the substrate in which the protrusion is implanted in the process.
Figure 9B:
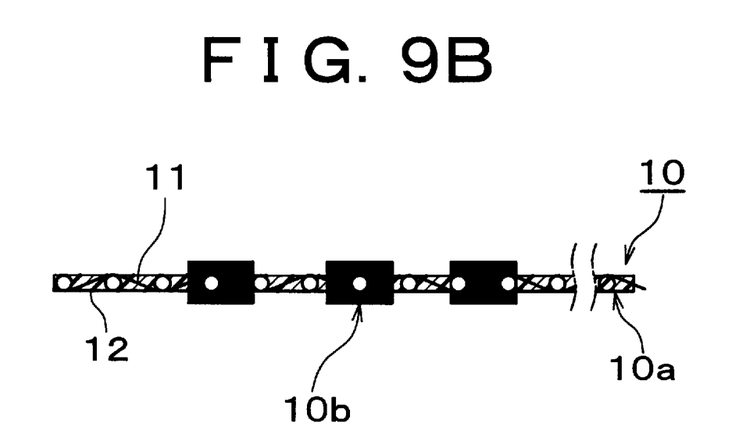

FIGS. 9A, 9B show a method for forming the protrusion 10b on the substrate 10a by a single printing action. According to this printing method, the black lead printing plate 30b and the second printing base 30d are employed. Upon printing the black lead ink 13 on the substrate 10a, as shown in FIG. 9A, the substrate 10a is placed on the second printing base 30d and the black lead printing plate 30b is placed on the substrate 10a, such that the respective through holes 35a in the black lead printing plate 30b, the respective through holes 12a in the substrate 10a and the respective recess portions 36 in the second printing base 30d oppose each other. Then, the black lead ink 13 is supplied to the screen 35 of the black lead printing plate 30b in this condition and the thus supplied black lead ink 13 is printed with the doctor knife 37. By such printing, the black lead ink 13 reaches the respective through holes 35a in the black lead printing plate 30b, the respective through holes 12a in the substrate 10a and the respective recess portions 36 in the second printing base 30d so as to form the respective protrusions 10b as shown in FIG. 9B.

Consequently, the separator 10 in which a plurality of the protrusions 10b are implanted in the substrate 10a is created. After that, this separator 10 is subjected to hardening process, in which the respective protrusions 10b are hardened. Here, in the hardening process, it is possible to employ drying/solidifying means, cooling/solidification means or other hardening means depending on the type of resin binder to be used.

The separator 10 is subjected to grinding process as required and then the cutting process. In the grinding process, the surfaces of the formed protrusions 10b in contact with the electrodes 21a, 21b are ground. Consequently, resin binder adhering to a portion contacting the electrodes 21a, 21b of each protrusion 10b is removed so as to secure an excellent conductivity of each protrusion 10b. In the cutting process, the separator 10 created in a large area is cut into a size suitable for a fuel cell for use. By adding the cutting process to the manufacturing process of the separator, it is possible to pick up plural pieces of the separators suitable for use from a separator having a large area, thereby increasing manufacturing efficiency of the separator greatly.

In the separator 10, the substrate 10a has a multiple layered structure in which both surfaces of the mesh foundation 11 are covered with the resin layers 12, so that the thickness of the substrate 10a is very small. Thus, by forming the substrate 10a super thin, and lightweight, the separator 10 can be constructed in which the thickness of the substrate 10a that becomes a dead space within the structure of a fuel cell is very small. As a result, the fuel cell can be formed in a small size in the direction of laminating respective components and the weight of the fuel cell can be greatly reduced.

In the separator 10, the black lead ink 13, which is a black lead paint, is applied to a single side or both sides of the substrate 10a so that it invades the through holes 12a in the substrate 10a. Then, the respective protrusions 10b are formed of black lead component of the black lead ink 13. Therefore, the respective protrusions 10b can be formed on the substrate 10a in a very short time, thereby making it possible to greatly reduce manufacturing time and cost for the separator 10.

Further, because the respective protrusions 10b are formed according to the method of coating the substrate 10a with the black lead ink 13, cost on a manufacturing die of the separator 10 can be greatly reduced. From this point of view also, the manufacturing cost of the separator 10 can be greatly reduced and at the same time, it is possible to correspond to diversification of the types of the separators easily.

In the foregoing description of the preferred embodiments, the separator for the fuel cell is employed. However, the embodiments do not limit the separator. A conductive plate may be manufactured by the method described in the embodiment.

What is claimed is:

1. A manufacturing method for a conductive plate comprising steps of:
   preparing a mesh foundation;
   forming a substrate by covering said mesh foundation with a resin layer, said resin layer being formed by coating a single side or both sides of said mesh foundation with resin or impregnating the mesh foundation with resin and having the through holes at predetermined positions and;
   forming protrusions protruding from a single side or both sides of the substrate at positions corresponding to the through holes in said resin layer by coating the single side or both sides of said substrate with said black lead paint; and
   hardening said protrusions formed on said substrate.

2. A manufacturing method according to claim 1 further comprising:
   after said hardening step, grinding the surface of each of said protrusions which makes contact with said electrodes.

3. A manufacturing method according to claim 1 wherein:
   in said substrate forming step, placing a screen on said mesh foundation, said screen having through holes facing positions of said mesh foundation to be covered with resin, and
   coating said resin on said screen, said resin being coated on said mesh foundation through said through holes of said screen so as to form said substrate in which said mesh foundation are covered with said rein layer having said through holes at said predetermined positions.

4. A manufacturing method according to claim 1 wherein:
   in said substrate forming step, placing said mesh foundation in which said both sides of said mesh foundation are covered with said resin layer on a base having black portions facing positions of said substrate in which said through holes are to be formed,
   irradiating said mesh foundation with light so as to melt said resin layer corresponding to said black portions, said through holes being formed at said predetermined positions in said substrate.

5. A manufacturing method according to claim 1 wherein said substrate having a first surface and a second surface facing in a direction opposite to said first surface,
   in said protrusions forming step, placing said substrate on a first base so that said first surface faces upward,
   placing said screen on said first surface of said substrate, said screen having through holes facing positions of said mesh foundation on which said protrusions are to be informed,
   covering said black leas paint on said screen to invade through holes of said substrate through said through holes of said screen so as to form said protrusions which are protruded on said first surface integrally with said substrate,
   placing said substrate in which said protrusions are protruded on said first surface, on a second base so that said second surface faces upward,
   placing said screen on said second surface of said substrate, said screen having through holes facing positions of said mesh foundation on which said protrusions are to be formed,
   covering said black leas paint on said screen to reach and adjoin an end portion of said protrusions located in said through holes of said substrate through said through holes of said screen, so as to form protrusions which are protruded on said second surface integrally with said substrate.

6. A manufacturing method according to claim 1, wherein;
   in said protrusions forming step, placing said substrate on a base having holes, said holes being located to face positions to be formed said protrusions,
   placing said screen having through holes, said through holes being located facing positions in which said protrusions are to be formed, and
   covering said black leas paint on said screen to invade through holes of said substrate through said through holes of said screen to reach a bottom of said holes of said base so as to form protrusions which are protruded on said first surface and second surface integrally with said substrate.

7. A manufacturing method according to claim 1, wherein;
   said conductive plate is a separator for a fuel cell, said separator forming a reactive chamber of said fuel cell, said protrusions being in contact with electrodes of said fuel cell.

8. A conductive plate manufactured by the manufacturing method according to claim 1.

9. A conductive plate manufactured by the manufacturing method according to claim 2.

* * * * *